(No Model.)
G. C. HENNING.
TRANSMISSION ROPE COUPLING.
No. 597,675.  Patented Jan. 18, 1898.
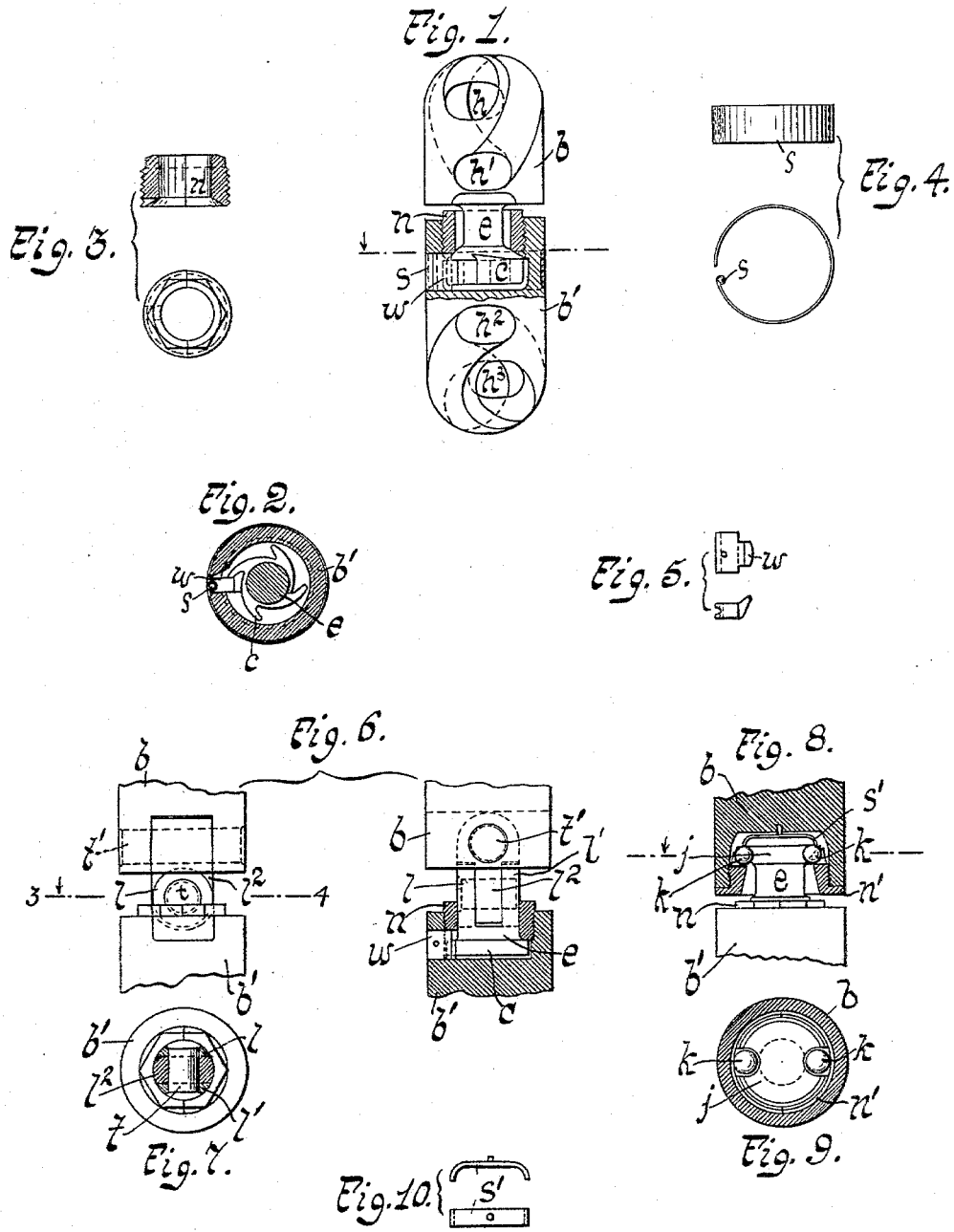
WITNESSES:
G Auld
W. B. Dowd
INVENTOR:
G. C. Henning,
BY
Wilcox, Buckley & Boder,
his ATTORNEYS.

UNITED STATES PATENT OFFICE.

GUSTAVUS C. HENNING, OF NEW YORK, N. Y., ASSIGNOR TO THE C. W. HUNT COMPANY, OF SAME PLACE.

TRANSMISSION-ROPE COUPLING.

SPECIFICATION forming part of Letters Patent No. 597,675, dated January 18, 1898.

Application filed January 28, 1895. Serial No. 536,430. (No model.)

*To all whom it may concern:*

Be it known that I, GUSTAVUS C. HENNING, a citizen of the United States, and a resident of New York city, in the county of New York and State of New York, have invented certain new and useful Improvements in Transmission-Rope Couplings, of which the following is a specification.

An object of this invention is to make the transmission-rope flexible at all points, so that it may pass around small wheels or drums whatever may be the size of the rope. Another object is to be able to vary the amount of twist in the rope without danger of accidental untwisting. Still another object is, in the case of ropes having strands whose number is a multiple of two, to get an even strain on the strands which pass through the eyes of the thimbles of the coupling, and other objects, as will hereinafter more fully appear.

In carrying this invention into effect I provide two thimbles to receive the ends of the rope. By preference each thimble is provided with strand-receiving eyes equal in number to half the number of strands (even) in the rope, which eyes are placed in different or intersecting planes. These thimbles are connected by a stud, rod, or link, which is or may be rigid with one of said thimbles and articulated and swiveled to the other, or which is articulated to one and is swiveled to the other of said thimbles. By preference the articulation is a universal joint or a ball-and-socket joint. Suitable means are provided for preventing the untwisting of the rope and for permitting of desired variations in the twist.

Several forms of the invention are shown in the accompanying drawings, forming part hereof, in which—

Figure 1 is a side view, partly in section, of a coupling wherein the thimbles are connected by a stud or bolt which is rigid with one thimble and which is connected with the other by a swiveling ball-and-socket joint, which, however, is locked against motion in the direction of untwisting the rope. Fig. 2 is a cross-section of the coupling shown in Fig. 1 at about the plane at the top of the detent for the swivel. Fig. 3 shows a split nut in longitudinal section and in plan. Fig. 4 shows a spring, in plan and edge views, for holding the detent in place. Fig. 5 shows the detent in side and edge views. Fig. 6 shows two views of another form of universal joint. Fig. 7 is a cross-sectional view on the line 3 4 of Fig. 6. Fig. 8 is a side view, partly in section, of a construction of the ball-and-socket joint which does not swivel, the swivel being in the thimble other than the one having said joint. Fig. 9 is a sectional plan view of the last-named joint, and Fig. 10 shows the ball-holding spring shown in Fig. 8.

Referring to the drawings, the thimbles are respectively marked $b$ and $b'$ and are shown with two strand-holding eyes each, which are indicated by the letters $h$ $h'$ $h^2$ $h^3$.

In Fig. 1 the thimble $b$ is provided with the rigid stud or bolt $e$, and which has the head $c$ connected with it by a spherical surface. The head $c$ is provided with a ratchet or toothed periphery for a purpose hereinafter more fully set forth. The thimble $b'$, Fig. 1, is provided with a socket which is threaded at the opening to receive the split nut $n$ and which is counterbored below that nut to allow freedom of motion to the head $c$. The function of the split nut $n$ is to hold the head $c$, and the nut $n$ is provided with a spherical countersink to match the sphericity of head $c$. The wall of the socket in thimble $b'$ is cut through at one point to receive the detent $w$, which coacts with the toothed portion of head $c$ to prevent the untwisting of the rope. The split nut $n$ is provided with a groove at one side to receive and guide the detent $w$, which thus locks the nut $n$ against accidental turning. The outer surface of the thimble $b'$ is channeled or grooved to receive the spring $S$, which holds the detent in place. The wall of the slot through thimble $b'$ is also beveled off to receive the toe of the detent (see Fig. 2) when moved outward for any purpose. The described construction attains all the ends above stated, since the ball-and-socket joint allows the coupling to bend. The ratchet and detent prevent untwisting of the rope and yet permit of variations in the twist. In the case of a four-stranded rope two strands at each end are cut short, while the other two are taken one each through the eyes $h$ $h'$ and $h^2$ $h^3$ and spliced back on its own part in the usual way, thus obtaining an equal strain on all strands.

Referring to Figs. 6 and 7, there are shown the thimbles $b\ b'$ and a gimbal-joint composed of the bar $l^2$, which is pivotally connected with thimble $b$ by means of ears on the thimble, and the pin $t'$, which passes through the said ears and said bar $l^2$. The rod or stud $e$ is swiveled to the thimble $b'$ in the manner above set forth, the spherical bearing being omitted, however, and is hinged or jointed to the bar $l^2$ by the pin $t$. The references $l\ l'$ mark jaws or ears of stud $e$. Referring to Figs. 8, 9, and 10, the stud $e$ is swiveled to thimble $b'$ in the manner last above set forth, but is not rigid with thimble $b$, as shown in Fig. 1, being connected thereto by a ball-and-socket joint. This joint is in some respects the same as that described above in connection with Fig. 1 and thimble $b'$, so that it is only necessary to describe the additional features and omissions. First, the teeth on the periphery are omitted and two grooves substituted (see Fig. 9) in the head of rod or link $e$. The split nut is provided with two corresponding grooves across its upper end. Two balls $k$ rest one in each of the pairs of grooves in the nut and head and so lock the head against swiveling, while a spring $s'$ holds the balls in place.

Many changes in details may be made without departing from the spirit of this invention, which is not limited to the precise constructions shown and described.

Having thus fully described my invention, what I claim as new is—

1. A coupling for transmission-ropes, &c., consisting of two thimbles connected by a universal joint and swiveled and means preventing untwisting of the rope and allowing the twist to be varied at will, in combination, substantially as and for the purposes described.

2. A coupling for transmission-ropes, &c., consisting of two thimbles connected by a ball-and-socket joint and swiveled and means preventing untwisting of the rope and allowing the twist to be varied at will, in combination, substantially as and for the purposes described.

3. A coupling for transmission-ropes, &c., consisting of two thimbles, a link or rod swiveled to one of said thimbles and articulated to the other of said thimbles and means preventing untwisting of the rope and allowing the twist to be varied at will, in combination, substantially as and for the purposes described.

4. A coupling for transmission-ropes, &c., consisting of two thimbles, a link or rod swiveled to one of said thimbles and connected to the other by a universal joint, and means preventing untwisting of the rope and allowing the twist to be varied at will, in combination, substantially as and for the purposes described.

5. A coupling for transmission-ropes, &c., consisting of two thimbles, a link or rod swiveled to one of said thimbles and connected to the other by a ball-and-socket joint and means preventing untwisting of the rope and allowing the twist to be varied at will, in combination, substantially as and for the purposes described.

6. A coupling for transmission-ropes, &c., consisting of two thimbles each having two eyes (or multiples thereof) and swiveled together, and means preventing untwisting of the rope and allowing the twist to be varied at will, in combination, substantially as and for the purposes described.

7. A coupling for transmission-ropes, &c., consisting of two thimbles each having two eyes (or multiples thereof) and articulated and swiveled together and means preventing untwisting of the rope and allowing the twist to be varied at will, in combination, substantially as and for the purposes described.

Signed at New York, in the county of New York and State of New York, this 19th day of January, A. D. 1895.

GUSTAVUS C. HENNING.

Witnesses:
 CHARLES A. BRODEK,
 OSCAR A. CAMPBELL.